(12) United States Patent
Maus et al.

(10) Patent No.: US 9,010,086 B2
(45) Date of Patent: Apr. 21, 2015

(54) DEVICE AND METHOD FOR TREATING EXHAUST GAS CONTAINING SOOT PARTICLES AND MOTOR VEHICLE HAVING THE DEVICE AND CARRYING OUT THE METHOD

(75) Inventors: Wolfgang Maus, Bergisch Gladbach (DE); Peter Hirth, Rösrath (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 351 days.

(21) Appl. No.: 13/419,633

(22) Filed: Mar. 14, 2012

(65) Prior Publication Data

US 2012/0186233 A1 Jul. 26, 2012

Related U.S. Application Data

(63) Continuation of application No. PCT/EP2010/062475, filed on Aug. 26, 2010.

(30) Foreign Application Priority Data

Sep. 14, 2009 (DE) .......................... 10 2009 041 091

(51) Int. Cl.
*F01N 3/00* (2006.01)
*F01N 3/027* (2006.01)
(Continued)

(52) U.S. Cl.
CPC .......... *F01N 3/0275* (2013.01); *B01D 46/0032* (2013.01); *B03C 3/013* (2013.01);
(Continued)

(58) Field of Classification Search
CPC ...... B01D 46/0032; B03C 3/013; B03C 3/12; B03C 3/383; B03C 3/49; B03C 3/68; B03C 2201/30; F01N 3/01; F01N 3/0231; F01N 3/0275
USPC ..................... 60/275, 295; 73/114.71, 114.67
See application file for complete search history.

(56) References Cited

U.S. PATENT DOCUMENTS 2,822,058 A * 2/1958 Roos et al. ........................ 96/66
4,924,668 A 5/1990 Panten et al.
(Continued)

FOREIGN PATENT DOCUMENTS

DE 3833957 A1 4/1990
DE 4130178 C1 8/1992
(Continued)

OTHER PUBLICATIONS

International Search Report of PCT/EP2010/062475, Dated Dec. 17, 2010.

*Primary Examiner* — Thomas Denion
*Assistant Examiner* — Matthew T Largi
(74) *Attorney, Agent, or Firm* — Laurence A. Greenberg; Werner H. Stemer; Ralph E. Locher

(57) ABSTRACT

A device for treating exhaust gas containing soot particles, includes at least one ionization element for ionizing soot particles and at least one separation device having a surface precipitator for depositing ionized soot particles. The at least one surface precipitator includes at least two at least partially electrically conductive neutralization regions that are electrically insulated from each other in order to neutralize ionized soot particles. A method for converting soot particles of an exhaust gas includes applying different electric potentials. A motor vehicle includes the device and carries out the method.

12 Claims, 4 Drawing Sheets

(51) Int. Cl.
*B01D 46/00* (2006.01)
*B03C 3/013* (2006.01)
*B03C 3/12* (2006.01)
*B03C 3/38* (2006.01)
*B03C 3/49* (2006.01)
*B03C 3/68* (2006.01)
*F01N 3/01* (2006.01)
*F01N 3/023* (2006.01)

(52) U.S. Cl.
CPC ............... *B03C 3/12* (2013.01); *B03C 3/383* (2013.01); *B03C 3/49* (2013.01); *B03C 3/68* (2013.01); *F01N 3/01* (2013.01); *F01N 3/0231* (2013.01); *B03C 2201/30* (2013.01)

(56) References Cited

U.S. PATENT DOCUMENTS

| | | | | |
|---|---|---|---|---|
| 4,945,721 | A | * | 8/1990 | Cornwell et al. ............. 60/274 |
| 5,223,009 | A | | 6/1993 | Schuster et al. |
| 6,374,595 | B1 | * | 4/2002 | Penetrante et al. ............ 60/275 |
| 7,243,489 | B2 | * | 7/2007 | Johnson et al. ............... 60/297 |
| 7,514,047 | B2 | | 4/2009 | Hirata et al. |
| 7,765,798 | B2 | * | 8/2010 | Bruck ............................. 60/286 |
| 8,308,846 | B2 | * | 11/2012 | Op de Laak et al. ............. 95/5 |
| 2005/0229564 | A1 | | 10/2005 | Okubo et al. |
| 2007/0017371 | A1 | | 1/2007 | Furukawa et al. |
| 2007/0028603 | A1 | | 2/2007 | Igarashi |
| 2010/0072055 | A1 | | 3/2010 | Tanaka et al. |
| 2011/0146234 | A1 | * | 6/2011 | Rynders et al. ............... 60/274 |
| 2012/0031077 | A1 | * | 2/2012 | Aoki ............................. 60/276 |

FOREIGN PATENT DOCUMENTS

| | | | | |
|---|---|---|---|---|
| DE | 602004000467 | T2 | | 9/2006 |
| EP | 1 640 573 | A1 | | 3/2006 |
| EP | 1 669 563 | A1 | | 6/2006 |
| EP | 1669563 | A1 | * | 6/2006 ............... F01N 3/02 |
| JP | 8291772 | A | | 11/1996 |
| JP | 2003269134 | A | * | 9/2003 ............... F01N 3/02 |
| JP | 2004068684 | A | | 3/2004 |
| JP | 2005036712 | A | | 2/2005 |
| JP | 2005232970 | A | | 9/2005 |
| JP | 2006170021 | A | | 6/2006 |
| JP | 2006342730 | A | * | 12/2006 |
| JP | 2007-187132 | A | | 7/2007 |
| KR | 100769571 | B1 | | 10/2007 |
| WO | 2008062554 | A1 | | 5/2008 |

* cited by examiner

DEVICE AND METHOD FOR TREATING EXHAUST GAS CONTAINING SOOT PARTICLES AND MOTOR VEHICLE HAVING THE DEVICE AND CARRYING OUT THE METHOD

CROSS-REFERENCE TO RELATED APPLICATION

This is a continuation, under 35 U.S.C. §120, of copending International Application No. PCT/EP2010/062475, filed Aug. 26, 2010, which designated the United States; this application also claims the priority, under 35 U.S.C. §119, of German Patent Application DE 10 2009 041 091.0, filed Sep. 14, 2009; the prior applications are herewith incorporated by reference in their entirety.

BACKGROUND OF THE INVENTION

Field of the Invention

The present invention relates to a device for treating exhaust gas containing soot particles, in particular by using an "electrostatic filter" or "electric filter" and to a suitable method for converting soot particles of an exhaust gas. The invention is used, in particular, in the treatment of exhaust gases of mobile internal combustion engines in the automotive field, in particular in the treatment of exhaust gases resulting from diesel fuel. Therefore, the invention also relates to a motor vehicle having the device and carrying out the method.

A large number of different concepts for eliminating soot particles from exhaust gases of mobile internal combustion engines have already been discussed. In addition to alternately closed wall-flow filters, open partial-flow filters, gravity separators, etc., systems have also already been proposed, in which the particles in the exhaust gas are charged electrically and are then deposited with the aid of electrostatic forces of attraction. Those systems are known, in particular, under the name "electrostatic filters" or "electric filters."

(A plurality of) emission electrodes and collector electrodes are thus generally proposed for such electric filters, with those electrodes being positioned in the exhaust gas line. For example, a central emission electrode, which runs approximately centrally through the exhaust gas line, and a surrounding outer surface of the exhaust gas line in the form of a collector electrode, are used to form a capacitor. With this configuration of the emission electrode and the collector electrode, an electric field is formed transversely to the direction of flow of the exhaust gas, in which the emission electrode can be operated, for example, with a high voltage which lies in a region of approximately 15 kV. In particular, corona discharges may thus be formed, as a result of which the particles flowing through the electric field together with the exhaust gas are charged in a unipolar manner. Due to that charging, the particles migrate towards the collector electrode as a result of electrostatic Coulomb forces.

In addition to systems in which the exhaust gas line is included as a collector electrode, systems are also known in which the collector electrode is formed as a wire mesh or grid, for example. Particles are deposited on the wire mesh for the purpose of optionally combining the particles with further particles so as to create an agglomeration. The exhaust gas flowing through the mesh then entrains the larger particles again and feeds them to conventional filter systems.

Although the above-described systems have previously been found to be suitable for the treatment of soot particles, at least in tests, the transfer of that concept for serial operation in motor vehicles, however, presents a great challenge. That is true, in particular, with regard to the highly fluctuating, periodically very high soot load in the exhaust gas, and also with regard to the desired possibility to retrofit such a system for current, existing exhaust gas installations. In particular, quantities of exhaust gas increasing constantly in an intermittent manner are present in the exhaust gas installation of motor vehicles, but are not present, for example, in stationary internal combustion engines, which are used for power production. Furthermore, exhaust gas systems are exposed to mechanical stresses, for example as a result of impacts, etc., for example due to unevennesses of the ground. It should also be considered that, with regard to the elimination of soot particles, the (periodic or continuous) regeneration of the filter systems is also necessary with the increased output of such exhaust gas installations, with the soot being transformed into gaseous constituents.

In the regeneration of filter systems, it is also known to convert soot through the use of nitrogen dioxide ($NO_2$), in addition to intermittent regeneration by short-term heating, that is to say combustion, of the soot (catalytically motivated, oxidative conversion). The advantage of continuous regeneration with nitrogen dioxide is that, in that case, soot can be converted at much lower temperatures (in particular below 250° C.). For that reason, continuous regeneration is preferred in many applications. However, that leads to the problem that it must be ensured that the nitrogen dioxide will sufficiently come into contact in the exhaust gas flow with the deposited soot particles.

In that regard, technical difficulties also emerge with the implementation of sustained operation of such exhaust gas installations in motor vehicles, wherein the different stresses on internal combustion engines lead to different exhaust gas flows, exhaust gas compositions and temperatures.

SUMMARY OF THE INVENTION

It is accordingly an object of the invention to provide a device and a method for treating exhaust gas containing soot particles and a motor vehicle having the device and carrying out the method, which overcome the hereinafore-mentioned disadvantages and at least partly solve the highlighted problems of the heretofore-known devices, methods and vehicles of this general type. In particular, a device for treating exhaust gas containing soot particles is to be specified, which at the same time provides a high separation efficiency for soot particles and can be easily regenerated. A corresponding method for converting soot particles of an exhaust gas is also to be specified. The device and the method are to be easily integrated in existing mobile exhaust gas systems and at the same time are to be producible in a cost-effective manner.

With the foregoing and other objects in view there is provided, in accordance with the invention, a device for treating exhaust gas containing soot particles. The device comprises at least one ionization element for ionizing soot particles, and at least one separation device having at least one surface separator for depositing ionized soot particles. The at least one separation device includes at least two at least partly electrically conductive neutralization regions for neutralization of ionized soot particles. The at least two neutralization regions are electrically insulated from one another.

In particular, the device proposed herein may be part of an exhaust gas installation of a motor vehicle which includes a diesel engine. However, the device can also be provided as a modular kit for an exhaust gas installation.

Firstly, at least one nitrogen dioxide source and/or at least one oxygen source is/are preferably provided, in particular upstream of the separation device. Such a nitrogen dioxide source is a catalytic converter, for example, which (together with other constituents of the exhaust gas, in particular oxygen), assists in the conversion of nitrogen oxides contained in the exhaust gas (in particular nitrogen monoxide NO) into nitrogen dioxide. In principle, a plurality of such nitrogen dioxide sources can also be provided, but this is not absolutely necessary. The nitrogen dioxide source can normally be implemented with a catalytic converter which includes a honeycomb body having a coating, wherein the coating includes platinum, rhodium, palladium or the like. The nitrogen dioxide source is consequently disposed downstream of the internal combustion engine and is therefore located, at least in part, in the exhaust gas system. Alternatively, the nitrogen dioxide source can also be implemented with the aid of measures inside the internal combustion engine. For example, an exhaust gas feedback can be implemented as a measure inside an internal combustion engine.

Whereas the nitrogen dioxide source is preferably used, for example, in relatively "cold exhaust gas systems" (for example diesel engine applications), an oxidative conversion of the soot particles using oxygen from an oxygen source can also be carried out at relatively high temperatures (for example gasoline engine applications). For example, the internal combustion engine itself or a "secondary air infeed," that is to say, in particular, the feed of an oxygenous gas into the exhaust gas line, are preferably considered as an oxygen source. A chemical reaction with a catalyst may possibly also produce oxygen, and therefore this may also be considered as an oxygen source.

In particular, a device is preferred which alternatively includes at least one nitrogen dioxide source or at least one oxygen source upstream of the surface separator or the separation device in the exhaust gas line.

In addition, at least one ionization element for ionizing soot particles is provided. The exhaust gas preferably reaches a nitrogen dioxide source first, before it reaches the section of the device having the at least one ionization element. The ionization element preferably has an ionization electrode or a multiplicity of ionization electrodes. The at least one ionization element is connected to a voltage source, in particular to a high-voltage source. A high-voltage source is a voltage source which produces electric voltages of at least 5 kV (5 kilovolts or 5,000 volts). The voltage can also be regulated through the use of a control unit. In principle, a direct current voltage source or an alternating current voltage source can be provided. The ionization electrode is preferably an emission electrode which is included in an approximately point-like (punctiform) or line-like (linear) manner. An approximately point-like emission electrode may be the tip of a wire for example. A line-like emission electrode may be a wire acting as an emission electrode along its length, for example. A corresponding counter-electrode is provided opposite the ionization electrode. An electric field may form between the ionization electrode and the counter-electrode. The approximately point-like or line-like emission electrode typically has a considerably smaller surface compared to the counter-electrode. For this reason, the electric field, which forms between the ionization electrode and the counter-electrode, is concentrated very strongly around the ionization electrode, and therefore charges may leak from the ionization electrode. The electric potentials of the ionization electrode and of the counter-electrode are preferably included in such a way that negative charges leak from the ionization electrode. Negative charges are generally more mobile than positive charges. These charges come into contact with the soot particles in the exhaust gas when the exhaust gas passes the ionization element. The soot particles become electrically charged. Reference is then also made to ionized soot particles.

Within the context of the invention, a surface separator is, in particular, a device in which soot particles are separated substantially in the vicinity of a (three-dimensional) surface. For example, component parts in which practically only a line-like deposition region for particles is provided (screen, mesh, etc.) are therefore not surface separators. Exhaust gas treatment components which include channel-like or chaotic surfaces, which are formed, for example, in honeycomb structures, are typical surface separators. Open separators or partial-flow filters, through which an exhaust gas can pass without the exhaust gas having to pass through a filter wall, are preferred. However, surface separators may also be porous wall filters or deep-bed filters.

Furthermore, at least one separation device, including at least one surface separator, is provided. This surface separator has a cross-sectional area and a length. For example, a surface separator may be a metal or ceramic honeycomb body having channels, which extend from an inlet face to an outlet face. The channels of such a surface separator have walls, on which soot particles can be deposited. Surface separators in which a multiplicity of channels are provided, for example at least 30 channels, at least 50 channels, or even at least 100 channels, are preferred. The expression "surface separator" is to be understood to mean that a very large surface (in particular also in relation to its volume) is provided for the deposition of soot particles. In contrast to known variants, in which the soot particles were agglomerated together within a restricted space as far as possible, in this case the objective is to distribute the soot particles extensively over the surfaces of the channel walls formed by the channels. However, it is not to be ruled out that soot particles are also deposited inside a porous channel wall, for example. Surfaces suitable for deposition can therefore be considered, in particular, to be the outer and inner surfaces of the channel walls in this case. A "channel" is understood, in particular, to mean a defined flow path, the extension of which is much longer than its diameter, wherein the diameter, in particular, is much larger than the conventional sizes of the soot particles. Although it is sufficient for some purposes to form separate and detached channels, communicating channels can also be provided, in which an exchange of partial exhaust gas flows is enabled (for example through openings in the channel walls).

In accordance with a development of the device, the separation device is annular. In particular, the separation device is disposed in an annular manner around the original central direction of flow of the exhaust gas so that the exhaust gas is deflected, at least in part, to flow through the separation device. The separation device is thus integrated, in particular, in an annular catalyst carrier. In particular, it is then possible for a central exhaust gas flow having an increased particle concentration to be guided through and, at the same time, for an outer exhaust gas flow having a reduced particle concentration to be guided into the catalyst carrier, for example an SCR catalytic converter.

In order to ensure that soot particles do not accumulate in only one plane at right angles to the direction of flow (as in a mesh or grid), the at least one surface separator includes at least two at least partly electrically conductive neutralization regions, which are electrically insulated from one another, for the neutralization of ionized soot particles.

Ionized soot particles preferably accumulate on oppositely charged surfaces or on neutrally charged surfaces.

Neutralization regions may have a specific electric potential by virtue of connection to a voltage source or to an electrical ground, and may therefore be electrically charged.

Due to the electric potential at a neutralization region, the potential which is present as a result of a voltage source or a ground, an electrical charge is present at the neutralization region. An electrical neutralization or deionization of the soot particles may thus take place upon contact of the electrically charged soot particles with a surface of a surface separator in a neutralization region. Ionized or electrically charged soot particles are also attracted or repelled over distances by the electrical forces of such neutralization regions.

The neutralization regions of the separation device can also simultaneously form, at least in part, the counter-electrode of the ionization element.

An electric field is generally formed between the at least one ionization element and the at least one separation device or the neutralization region of the at least one separation device. This electric field extends, in particular, in the direction of the exhaust gas system or in the direction of flow of the exhaust gas so that electrically charged soot particles are drawn through the electric field in the direction of flow, so that the exhaust gas reaches the at least one ionization element first, and later reaches the at least one separation device with its neutralization regions. The at least one ionization element and the neutralization regions are therefore disposed in succession in the direction of flow of the exhaust gas, in particular at a distance of a few cm (centimeters), for example at least 5 cm, at least 15 cm, or even at least 30 cm.

Alternatively, it is also possible for the ionization element and for the separation device and neutralization regions formed thereon to be electrically independent of one another. Ionized soot particles are conveyed from the ionization element into the separation device by the exhaust gas flow, independently of an electric field which may be present. It is preferable if there is no electric field present between the at least one ionization element and the neutralization regions. Rather, the ionization element and the separation device with its neutralization regions for neutralization of ionized soot particles are systems separate from one another in an embodiment of this type, and can be understood to be "black box systems." The exact technical methods and configurations with which the ionization takes place in the ionization element and with which the deposition of the ionized soot particles takes place in the surface separator can be selected arbitrarily and independently of one another by a person skilled in the art.

As a result of the formation of two neutralization regions on the at least one separation device, these neutralization regions being electrically insulated from one another, it is possible to influence the distribution of the soot particles in the surface separator. For example, a neutralization region can be formed in such a way that ionized soot particles are neutralized in this region only up to a certain threshold loading of the surface separator with soot particles.

In order to achieve the most uniform possible deposition of soot particles in the surface separator, the shape, size and number of neutralization regions and also of the surface separator itself can be adapted accordingly. It is also possible to connect the individual neutralization regions differently to voltage sources and/or electrical grounds, with these neutralization regions being electrically insulated from one another. In addition, the electric field strength between the neutralization regions and the ionization element can be modeled so as to influence the deposition of ionized soot particles in the surface separator.

In accordance with another preferred feature of the device of the invention, the neutralization regions can each be assigned to sub-regions of the at least one surface separator.

The surface separator is preferably at least partly electrically conductive so that the electrical charge present on the ionized soot, after being transferred at least partly to the surface separator upon deposition of the soot particles on the surface separator, can be discharged therefrom. As a result of long-term deposition of ionized soot particles, an electrically insulated surface separator obtains an electrical charge which can prevent the deposition of further, charged, ionized soot particles. A surface separator of this type may include a plurality of sub-regions, which are each electrically conductive and each form a neutralization region of the surface separator, wherein these electrically conductive sub-regions are electrically insulated with respect to one another.

Alternatively, it is also possible for the neutralization regions not to be assigned to sub-regions of the surface separator, but to be instead disposed around the surface separator as planar electrodes, for example. In such a configuration it is preferable for an electrically non-conductive surface separator to be provided. For example, the neutralization regions can be disposed in such a way that an electric field oriented at right angles to the direction of flow of the exhaust gas is present in the surface separator. Electrically charged soot particles are deflected transversely to the direction of flow of exhaust gas by an electric field of this type and are thus moved towards the channel walls or the surface of the surface separator. The surfaces of the surface separator can be electrically neutralized, for example, since the orientation of the electric field is regularly changed between the individual neutralization regions so that ionized soot particles are drawn in different directions and the charges are mutually neutralized. It is also possible that the ionization element does not always produce merely ionized soot particles having the same charge, that is to say, in particular, always positively charged or always negatively charged soot particles, but that the charges of the soot particles exiting from the ionization element alternate regularly so that negatively electrically charged soot particles are neutralized shortly after positively electrically charged soot particles.

In accordance with a further preferred feature of the device of the invention, control devices are assigned to each of the neutralization regions. The control devices have at least one electrical ground, at least one adjustable voltage source and/or at least one switch element.

The electrical properties of the neutralization regions can be changed over time with the aid of control devices of this type. For example, it is possible to bring a neutralization region or a plurality of neutralization regions to such an electric potential that ionized soot particles are separated thereon. This may be achieved, for example, since all neutralization regions are connectable to an electrical ground through individual switch elements. It is also possible for adjustable voltage sources to be provided for the neutralization regions so that each neutralization region can be brought to a predefinable electric potential. In this way, it is even possible to deflect soot particles out from individual regions of the surface separator in a selective manner so as to feed them to other regions of the surface separator in order to achieve targeted deposition there.

In accordance with an added feature of the device of the invention, the at least two neutralization regions are formed as annular electrodes and/or as planar contacts.

If electrodes of this type are provided, the surface separator is preferably not electrically conductive, or is only electrically conductive to a slight extent. In this case, low conductivity means that, due to the electric currents occurring in the surface separator, there is a significant potential drop within the surface separator. Electric currents occur in the surface separator as a result of the charges of the ionized soot particles.

If neutralization regions shaped as annular electrodes or as planar contacts are provided on the device according to the invention, these are preferably disposed on the outlet face and/or on the outer surface of the surface separator. The outer surface is the peripheral surface present between the inlet face and the outlet face of the surface separator. The surface separator is preferably cylindrical in shape. The end faces of the cylindrical shape each form the inlet face and the outlet face, and the outer surface is the peripheral surface of the cylindrical shape.

For example, an annular electrode may have a diameter corresponding to the diameter of the surface separator, and may be disposed on the outlet face along the periphery of a honeycomb body. The electric field then forms towards this annular electrode in the outer region of the surface separator so that ionized soot particles are transported in this case, in particular. This is advantageous, in particular, because the speed of the exhaust gas flow in the outer region of a surface separator is normally much slower than the speed in the inner region, and therefore a more uniform deposition of ionized soot particles is achieved in the surface separator as a result of an increased transport of ionized soot particles into the outer region.

A planar contact is preferably formed in a planar manner at the outlet region of the surface separator. Ionized soot particles are thus transported effectively into the channels of the surface separator.

In accordance with an additional advantageous feature of the device of the invention, a honeycomb body is provided for each neutralization region in the surface separator. A honeycomb body of this type may preferably be disk-like or disk-shaped.

Honeycomb bodies of this type may either be electrically conductive, or may not be electrically conductive. Electrically conductive honeycomb bodies are preferably metal or are made of a ceramic material, in which electrical conducting structures, for example electrically conductive fibers, are incorporated to produce an electric conductivity. Honeycomb bodies which are not electrically conductive are preferably ceramic honeycomb bodies. If a disk-like honeycomb body is provided for each neutralization region, these honeycomb bodies may each be disposed at a distance from one another. In addition, an insulation of the individual honeycomb bodies with respect to the housing may be provided. The individual neutralization regions can thus be insulated from one another.

If the individual honeycomb bodies are not conductive, a planar contact is preferably provided on the outlet sides of the individual honeycomb bodies in each case. In the case of non-conductive honeycomb bodies, only the contact is to be considered as a neutralization region.

Electrically conductive honeycomb bodies can be contacted in any manner. As a result of contact, the entire electrically conductive honeycomb body acts as an electrode and therefore also as an entire neutralization region. No electric field is generally formed within electrically conductive honeycomb bodies, but electric fields exist merely as far as the outer faces of electrically conductive honeycomb bodies of this type, because a uniform electric potential is generally present in an electrically conductive honeycomb body. Electrically conductive honeycomb bodies are to be considered completely as neutralization elements. Electrically conductive honeycomb bodies are formed of metal layers, for example preferably of smooth and corrugated metal layers, in particular being coiled, wound and/or stacked.

It is also possible to use partly electrically conductive honeycomb bodies. Either the conductivity of such partly conductive honeycomb bodies can be limited in such a way that a potential difference is produced within the honeycomb body due to a flow of current, or the honeycomb body may include electrically conductive sub-regions and electrically non-conductive sub-regions. For example, it is possible to provide a conductivity of the honeycomb body in the edge region. An increased attraction of ionized soot particles can thus be achieved in edge regions, and the lower deposition amounts due to the lower exhaust gas speeds in the edge regions of the honeycomb body can thus be offset.

With the objects of the invention in view, there is also provided a method for converting soot particles of an exhaust gas. The method comprises the following steps:

a) producing nitrogen dioxide in the exhaust gas;
b) ionizing soot particles with at least one ionization element;
c) depositing ionized soot particles in at least one surface separator having at least two electrically conductive neutralization regions for neutralization of ionized soot particles; and
d) contacting the deposited soot particles with nitrogen dioxide in the at least one surface separator.

The at least two neutralization regions each have an electric potential, and the electric potential of at least one of the at least two neutralization regions is different than the electric potential of at least one other of the at least two neutralization regions.

In particular, a continuous regeneration of soot particles is thus provided in the device proposed in accordance with the invention. It should be noted that the features illustrated with reference to the device can be drawn on to explain the method, and vice versa. The method can be carried out, in particular, by using the device according to the invention.

It is preferable for all of the steps a) to d) to be carried out permanently during the operation of a mobile internal combustion engine.

In addition, it is preferable if step a) includes the provision of nitrogen dioxide by an appropriate exhaust gas converter and/or the provision of nitrogen dioxide by measures inside the engine. In this case, a measure inside the engine may be an exhaust gas feedback, for example.

The deposition of soot particles in the surface separator can be influenced by influencing the electric potential of the neutralization regions.

In accordance with another preferable mode of the method of the invention, the electric potentials of the at least two neutralization regions are set in such a way that soot particles are deposited substantially uniformly in the surface separator. There is preferably uniform deposition on (or in) the surfaces of the surface separator.

In accordance with a further particularly advantageous mode of the method of the invention, the electric potentials of the neutralization regions are varied over time. For example, it is possible to provide a neutralization region with a specific electric potential, so as to first achieve a deposition of ionized soot particles in this case, and to then deposit another electric potential on this neutralization region so as to stop ionized soot particles from being deposited in the vicinity of this neutralization region. At the same time, an electric potential can be applied to another neutralization region so as to achieve or to promote the deposition in this case of ionized soot particles.

Different approaches are conceivable with regard to the way in which uniform deposition of ionized soot particles can be promoted as a result of a temporal variation of the electric potentials at the ionization regions.

In a first variant of the method according to the invention the electric potentials of the neutralization regions are varied at high frequencies, for example at frequencies above 10 kHz, 20 kHz, or even 50 kHz (high-frequency variation). In this variant ionized soot particles are deposited substantially uniformly at all times on all surfaces of the surface separator.

In a second variant electric potentials of the individual neutralization regions are varied at very low frequencies. For example, the electric potentials of the individual neutralization regions may be changed once at most within a minute, preferably once at most within two minutes, and in particular once at most within five minutes (low-frequency variation with frequencies below one Hertz [1/second]). In this variant ionized soot particles are deposited over regions in the surface separator, and are deposited uniformly over the entire surface separator when considered over a longer period.

In accordance with an added advantageous mode of the method of the invention, the neutralization regions can be assigned to sub-regions of the surface separator, and a neutralization region is deactivated if a maximum loading with soot particles has been exceeded in the assigned sub-region of the surface separator.

With this implementation of the method, only one neutralization region is preferably always simultaneously connected to a ground electrode, and ionized soot particles are deposited in the assigned sub-region. The remaining sub-regions are electrically charged by the deposition of ionized soot particles until further ionized soot particles can no longer accumulate on these sub-regions, but advance as far as the respective activated neutralization region.

In accordance with an additional advantageous mode of the method of the invention, all of the neutralization regions have different electric potentials and an increasing electric field or a decreasing electric field exists in the surface separator along a direction of flow of exhaust gas.

For successful deposition of electrically charged soot particles in a surface separator, it is necessary for the electrical charge of the accumulated soot particles to be dischargeable through the surface separator, because the surfaces of the surface separator will otherwise become electrically charged. Furthermore, it is advantageous if an electrically conductive honeycomb body includes basically no electric field in its interior, if there is no flow of current present in the honeycomb body. In order to produce an increasing or decreasing electric potential in an electrically conductive surface separator, it is necessary to electrically insulate different sub-regions of the surface separator with respect to one another. With a configuration of this type it is possible for the electric field in the surface separator to be created from the inlet face to the outlet face in such a way that ionized soot particles adhere substantially uniformly in the surface separator, in particular over the length of the surface separator.

With the objects of the invention in view, there is concomitantly provided a motor vehicle, comprising an internal combustion engine and an exhaust gas system including a device according to the invention or configured to carry out the method according to the invention.

Other features which are considered as characteristic for the invention are set forth in the appended claims, noting that the features mentioned individually in the claims can be combined in any technically feasible manner and present further embodiments of the invention.

Although the invention is illustrated and described herein as embodied in a device and a method for treating exhaust gas containing soot particles and a motor vehicle having the device and carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
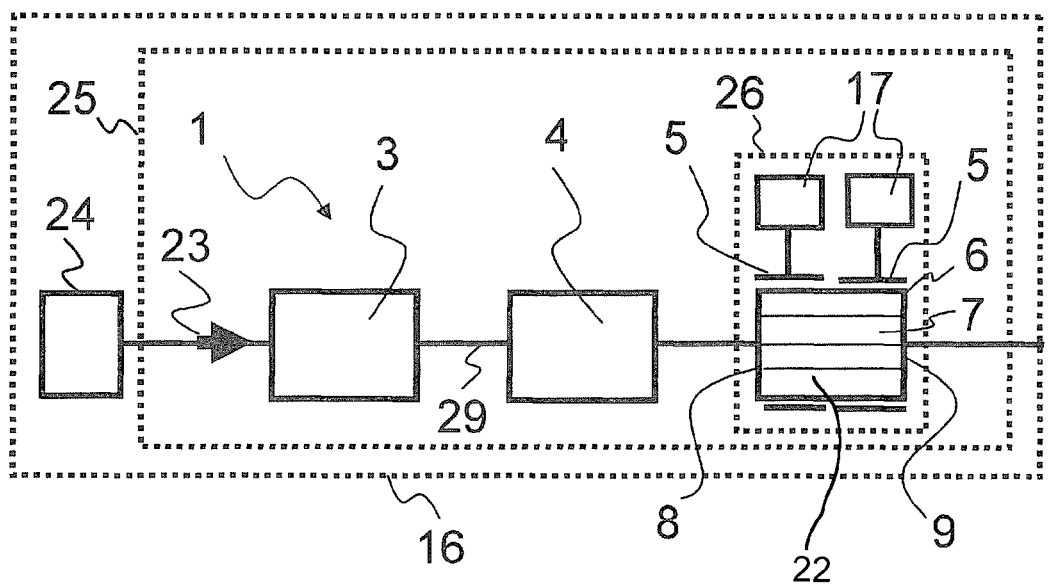
FIG. 1 is a diagrammatic, plan view of a motor vehicle including a preferred variant of a device according to the invention.

Referring now to the figures of the drawings in detail and first, particularly, to FIG. 1 thereof, there is seen a motor vehicle 16 which includes an internal combustion engine 24 and an exhaust gas system 25 with an exhaust gas line 29, through which exhaust gas from the internal combustion engine 24 can flow in an exhaust gas flow direction 23, starting from the internal combustion engine 24. A device 1 according to the invention, for treating exhaust gas containing soot particles, is provided at the exhaust gas line 29 in the exhaust gas system 25. The device 1 according to the invention includes, in succession in the exhaust gas flow direction 23 along the exhaust gas line 29, a nitrogen dioxide source 3, an ionization element 4, and a surface separator or precipitator 6. The surface separator 6 is preferably provided as a honeycomb body 22 having channels 7 which run from an inlet region 8 to an outlet region 9. Neutralization regions 5 are provided on the surface separator 6. The neutralization regions 5 can be controlled by control devices 17. The surface separator 6, the neutralization regions 5 and the control devices 17 together form a separation or precipitation device 26. The separation device 26 and the ionization element 4 can be operated in combination in a preferred variant of the invention, that is to say they can be controlled and regulated together, or they may be two individual systems ("black box systems") each of which operate independently of the other element and can be controlled and regulated independently of one another.

Figure 2:
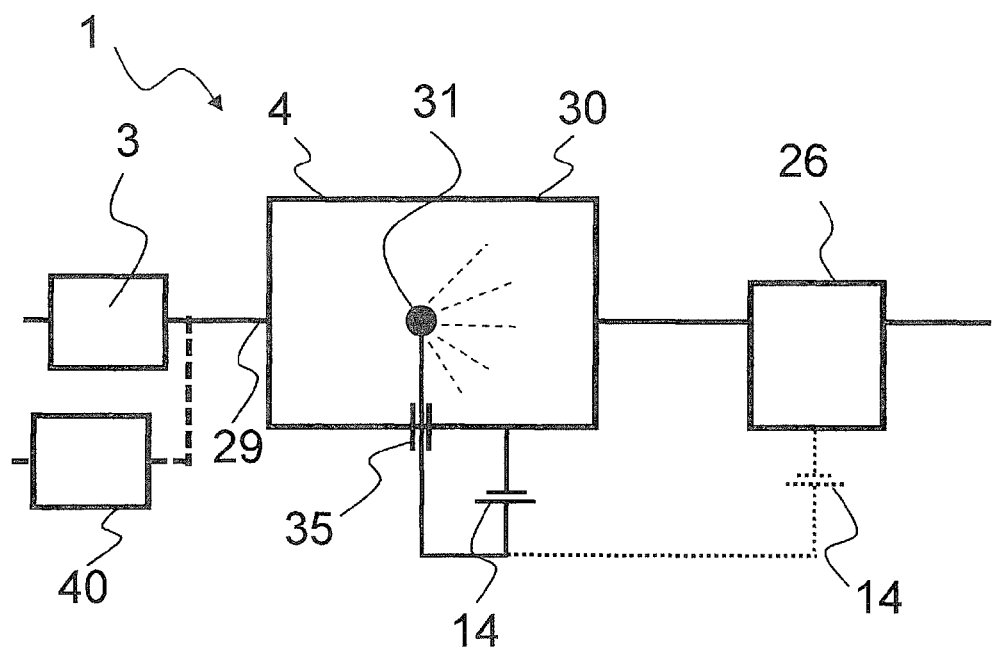
FIG. 2 is a block diagram of a preferred variant of a device according to the invention.

FIG. 2 shows a device 1 according to the invention, in which special attention has been paid in this case to the illustration of the ionization element 4, and the nitrogen dioxide source 3 and the separation device 26 in the exhaust gas line 29 are merely diagrammatically illustrated. An emission electrode 31 is provided in the ionization element 4 according to FIG. 2. A voltage can be applied between the emission electrode 31 and a housing 30 of the ionization element 4, or between the emission electrode 31 and the separation device 26. The voltage can be produced with the aid of a voltage source 14. The housing 30 and the separation device 26 are insulated from the emission electrode 31 for this purpose through the use of electrical insulation 35. This structure is not the only possible structure for an ionization element 4. For example, rod-like emission electrodes can also be provided. Superstructures of ionization elements 4, in which the ionization is achieved between two planar electrodes, are also possible. When using the method according to the invention, the nitrogen dioxide produced in the nitrogen dioxide source 3 is used for regeneration of the surface separator 6 in the separation device 26. The carbon in the soot particles in the surface separator 6 is converted into carbon dioxide by reaction with the nitrogen dioxide.

An oxygen source 40 may be provided alternatively to the nitrogen dioxide source 3, as is illustrated in FIG. 2 as an alternative which is connected to the exhaust gas line 29 by a dashed line. The surface separator 6 in the separation device 26 can be regenerated by providing oxygen, with the carbon being oxidized to form carbon dioxide. "Continuous regeneration operation" is preferable in both variants, in which (under normal operating conditions in the exhaust gas line) the at least one surface separator 6 is regenerated continuously.

Figure 3:
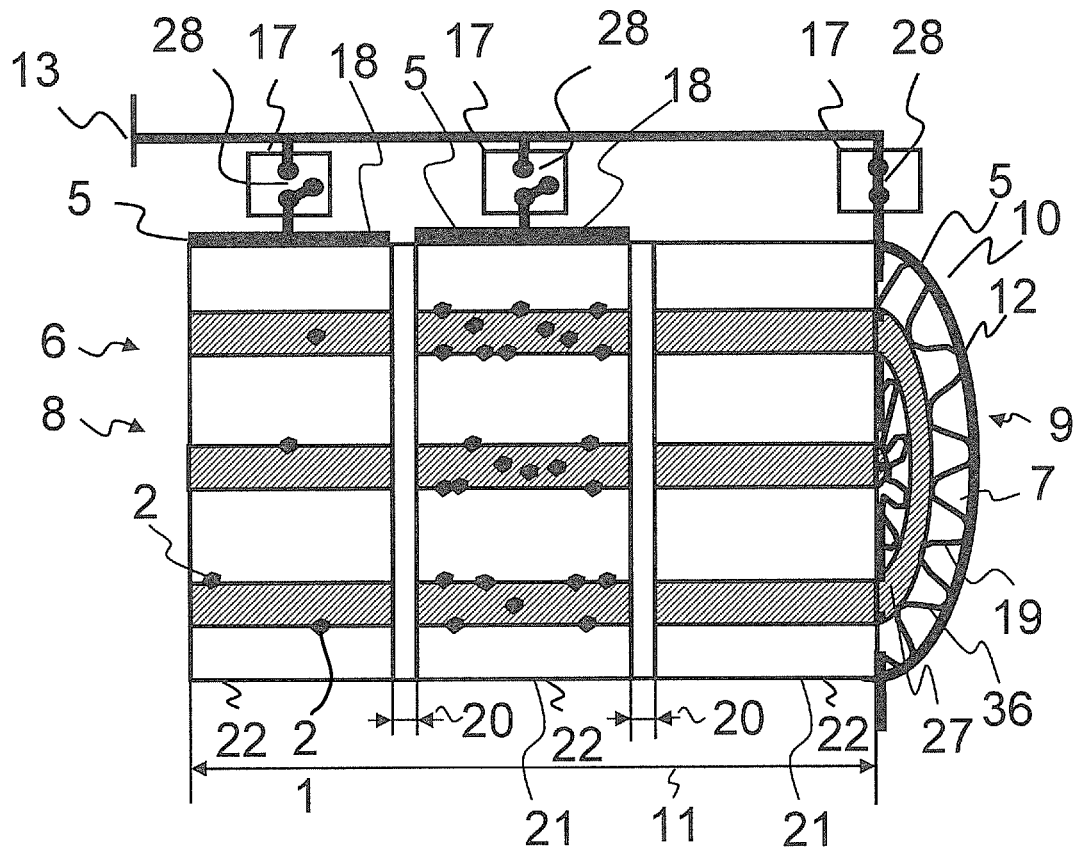
FIG. 3 is an enlarged, longitudinal-sectional view of a surface separator for a preferred variant of a device according to the invention.

FIG. 3 shows a surface separator 6 for a device 1 according to the invention. The surface separator 6 according to FIG. 3 is composed of three honeycomb bodies 22 disposed in succession. The honeycomb bodies 22 are each disposed at a distance 20 from one another. Overall, the surface separator 6 has a length 11. Three sub-regions 21 are provided in the surface separator 6 and each correspond to one of the three honeycomb bodies 22. A neutralization region 5 can be assigned to each sub-region 21. The surface separator 6 includes an inlet region 8 and an outlet region 9. In this case, two of the neutralization regions 5 are provided as a planar contact 18, by way of example. One neutralization region 5 is provided as an annular electrode 12. The neutralization regions 5 can each be controlled by a respective control device 17. The control devices 17 each include a switch element 28. The individual neutralization regions can be connected to an electrical ground 13 with the aid of the switch element 28 in the control devices 17. The individual honeycomb bodies 22 each include channels 7, a cross-sectional area 10 and channel walls 19. The channel walls 19 are formed in this case from a corrugated metal foil 36 and a non-woven material 27. Soot particles can be deposited particularly easily on the non-woven material 27. The deposition will also occur, in part, in the non-woven material 27. The non-woven material is therefore a component of the surface separator 6.

In FIG. 3, the middle honeycomb body 22 is filled particularly heavily with soot particles 2. As seen from the inlet region 8, the front two honeycomb bodies 22 are deactivated with the aid of the switch elements 28 in the respective control elements 17. The last honeycomb body 22 is activated with the aid of the switch element 28 in the assigned control element 17. In accordance with FIG. 3, the soot particles 2 are accordingly preferably deposited in the last honeycomb body 22.

Figure 4:
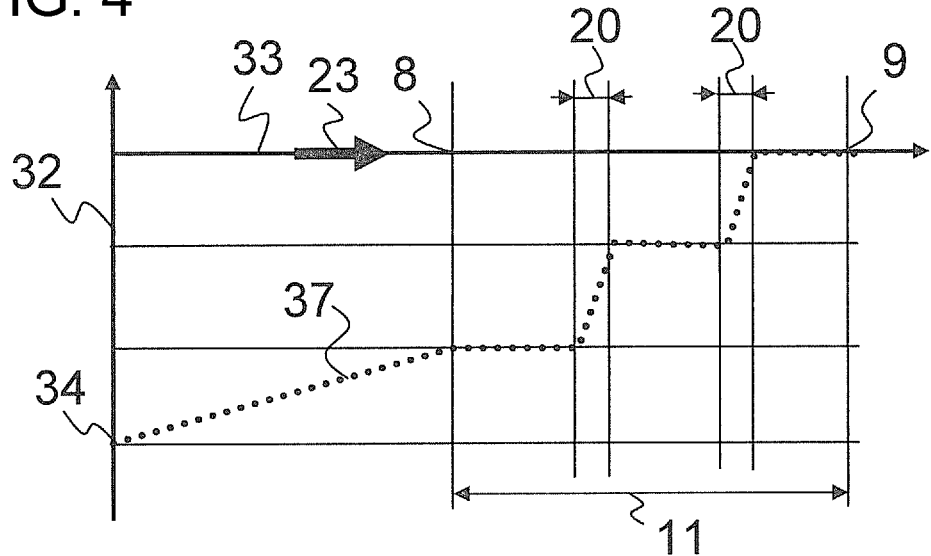
FIG. 4 is a diagram illustrating electric potential in a preferred variant of a device according to the invention when implementing a preferred variant of a method according to the invention.

FIG. 4 shows an example of an electric potential 37, which may be present in a device 1 according to the invention. The electric potential 37, which extends over a longitudinal axis 33 of the device 1 according to the invention, is plotted on a voltage axis 32. Exhaust gas flows through the device along the longitudinal axis 33 in the flow direction 23. An ionization potential 34 is present at the start. This is maintained by an ionization voltage applied to the ionization element 4. The potential then increases along the longitudinal axis 33 and in the exhaust gas flow direction 23, as far as the inlet region 8 in the surface separator 6. The potential 37 increases in a stepped manner in the surface separator 6. For example, individual electrically conductive honeycomb bodies 22 are provided in the surface separator 6, and the individual potentials 37 in these honeycomb bodies 22 are maintained with the aid of separate voltage sources 14 in control devices 17 assigned to each of the honeycomb bodies. There is no electric field inside the electrically conductive honeycomb bodies 22, and therefore the potentials 37 are constant there. The individual honeycomb bodies 22 are each disposed at a distance 20 from one another. An electric field is present over each of the distances 20 due to the potential differences of the individual honeycomb bodies 22, and the potential 37 increases continuously between the honeycomb bodies.

Figure 5:
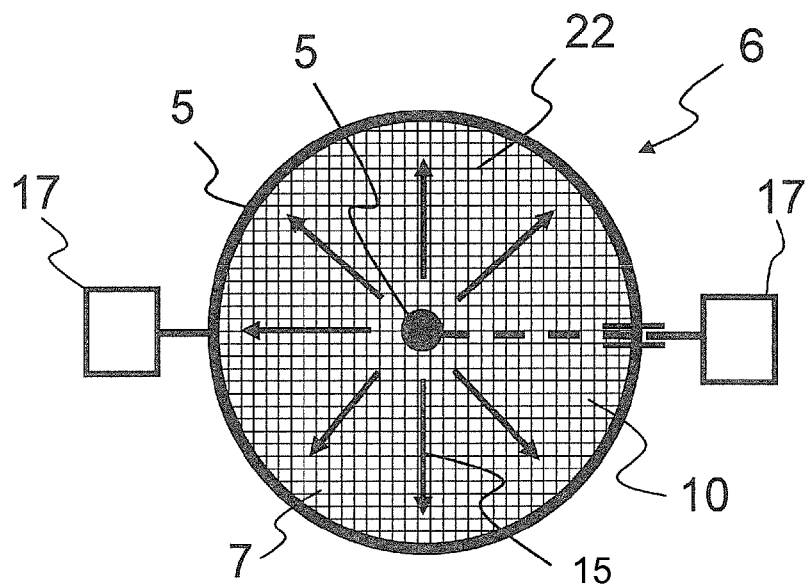
FIG. 5 is a cross-sectional view of a surface separator for a further preferred variant of the device according to the invention.

A cross-sectional area 10 of a surface separator 6 is illustrated in FIG. 5. The surface separator 6 according to FIG. 5 has a neutralization region 5 in its interior and a neutralization region 5 on its exterior. The honeycomb body 22 disposed in the surface separator 6 is not electrically conductive, and therefore an electric field 15 can form starting from the inner ionization region 5 to the outer ionization region 5. Ionized soot particles can be transported from the inner region of the surface separator 6 into the outer region of the surface separator 6 by an electric field 15 of this type. The voltages or potentials applied to each of the ionization regions 5 can be varied with the aid of the control devices 17.

Figure 6:
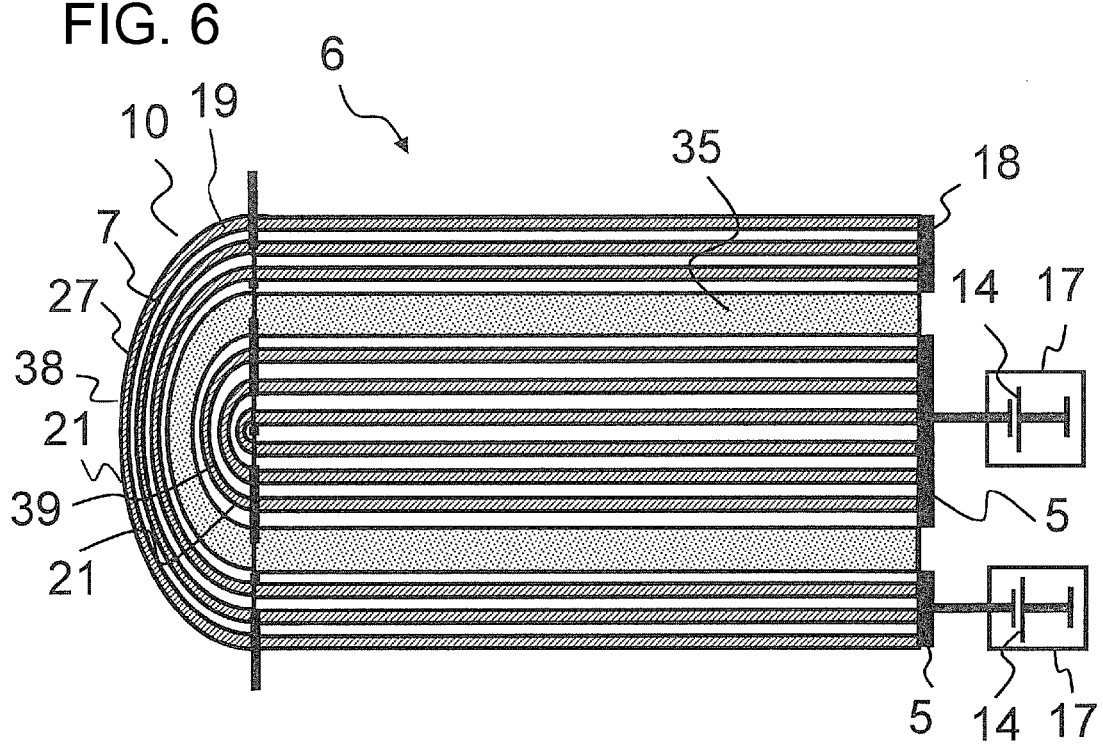
FIG. 6 is a longitudinal-sectional view of a surface separator for a further preferred variant of the device according to the invention.

FIG. 6 shows a surface separator 6, which includes a plurality of sub-regions 21 over the cross-sectional area 10, in which these sub-regions are insulated from one another with the aid of insulation 35. Neutralization regions 5 are assigned to each of the sub-regions 21 and these sub-regions are contacted in turn by planar contacts 18. Each of the neutralization regions 5 includes control devices 17 and voltage sources 14. The surface separator 6 also has channels 7 and channel walls 19 made of non-woven material 27. In a surface separator 6 of this type it is possible to control, in a targeted manner, whether ionized soot particles are to be deposited in a radially outer region 38 or in a radially inner region 39.

Figure 7:
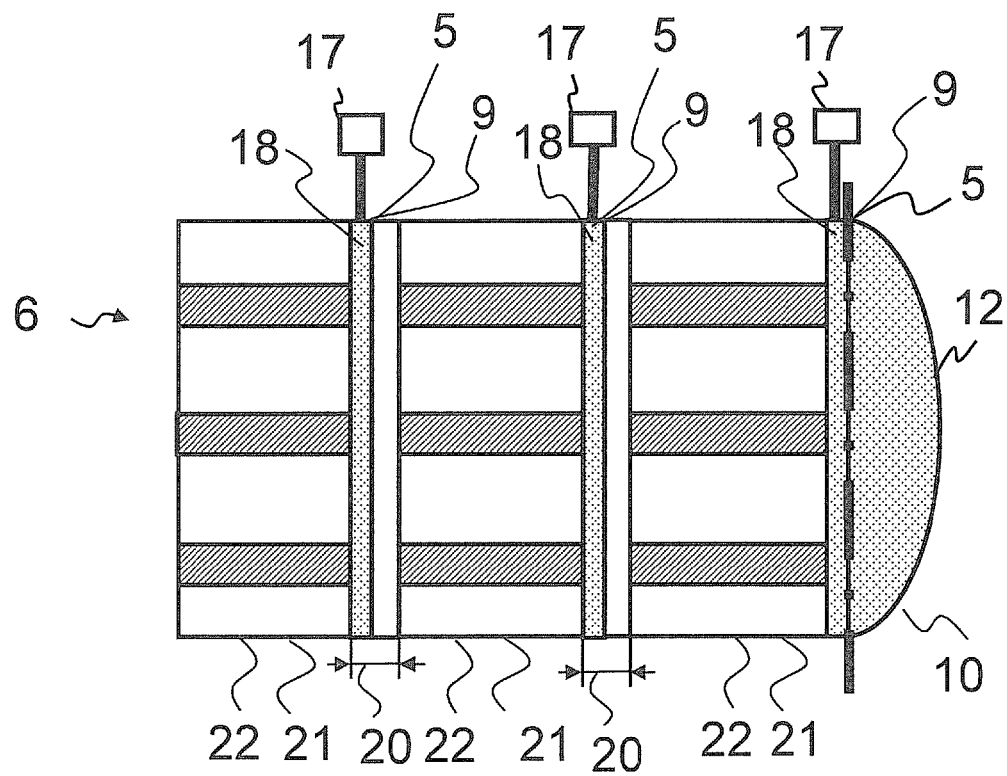
FIG. 7 is a longitudinal-sectional view a surface separator for a further preferred variant of the device according to the invention.

FIG. 7 shows a surface separator 6 which is formed from disk-like ceramic honeycomb bodies 22. The honeycomb bodies 22 each form sub-regions 21 of the surface separator 6. In addition, the honeycomb bodies 22 are each disposed at a distance 20 from one another and are each provided with a planar contact 18 at their respective outlet regions 9. These contacts 18 form the neutralization regions 5. The planar contacts 18 span the entire cross-sectional area 10 of the surface separator 6 in each case. A surface separator 6 of this type makes it possible to set the depth of penetration of ionized soot particles into the surface separator 6, in a defined manner.

Figure 8:
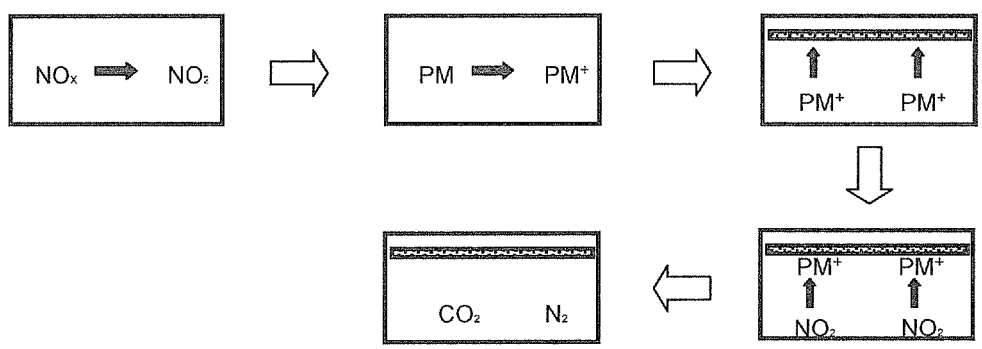
FIG. 8 is a diagram illustrating the method according to the invention.

FIG. 8 is intended to once again depict individual method steps. In this case nitrogen oxide ($NO_x$) and nitrogen monoxide (NO) are converted into nitrogen dioxide ($NO_2$) through the use of the nitrogen dioxide source (or an appropriate catalytic coating) in a first step. In addition, the soot particles (PM) or some of the soot particles are ionized so that they include an electrical charge. The ionized or electrically charged soot particles (PM$^+$) are then deposited uniformly on a channel wall with the help of corresponding electrostatic forces of attraction, and this occurs very uniformly as far as possible. The soot particles which are distanced further, which are possibly still electrically charged or which may even already be neutralized (PM$^+$/PM), are freely accessible to the produced nitrogen dioxide (NO$_2$) so that the deposition surface or the filter material can be regenerated in a simple and effective manner. Catalysts can also be used supportingly for this conversion process. Once the soot particles have been converted, the gaseous residual constituents, such as carbon dioxide (CO$_2$) and elemental nitrogen (N$_2$), are removed from the surface separator.

The invention claimed is:

1. A device for treating exhaust gas containing soot particles, the device comprising:
    at least one ionizer for ionizing soot particles;
    at least one separator having at least one surface separator for depositing ionized soot particles;
    said at least one separator including at least two at least partly electrically conductive neutralization regions for neutralization of ionized soot particles, said at least two neutralization regions being electrically insulated from one another;
    said at least two neutralization regions each having an electric potential, and said electric potential of at least one of said at least two neutralization regions being different than said electric potential of at least one other of said at least two neutralization regions, for achieving a targeted deposition of soot particles; and
    controllers each associated with a respective one of said at least two neutralization regions, said controllers having at least one electrical ground, at least one adjustable voltage source or at least one switch element.

2. The device according to claim 1, wherein said at least one surface separator has sub-regions, and said at least two neutralization regions are each associated with a respective one of said sub-regions.

3. The device according to claim 1, wherein said at least two neutralization regions are formed as at least one of annular electrodes or planar contacts.

4. The device according to claim 1, wherein each of said at least two neutralization regions has a respective honeycomb body in said at least one separator.

5. The device according to claim 1, which further comprises at least one nitrogen dioxide source or at least one oxygen source.

6. A method for converting soot particles of an exhaust gas, the method comprising the following steps:
    a) producing nitrogen dioxide in the exhaust gas;
    b) ionizing soot particles with at least one ionizer;
    c) depositing ionized soot particles in at least one surface separator having at least two electrically conductive neutralization regions for neutralization of ionized soot particles; and
    d) contacting the deposited soot particles with nitrogen dioxide in the at least one surface separator;
    the at least two neutralization regions each having an electric potential, and the electric potential of at least one of the at least two neutralization regions being different than the electric potential of at least one other of the at least two neutralization regions, achieving a targeted deposition of soot particles.

7. The method according to claim 6, which further comprises setting the electric potentials of the at least two neutralization regions to cause soot particles to be deposited substantially uniformly in the at least one surface separator.

8. The method according to claim 6, which further comprises varying the electric potentials of the at least two neutralization regions over time.

9. The method according to claim 6, which further comprises providing the at least one surface separator with sub-regions each associated with a respective one of the at least two neutralization regions, and deactivating one of the at least two neutralization regions if a maximum loading with soot particles has been exceeded in the sub-region of the at least one surface separator associated with the one neutralization region.

10. The method according to claim 6, wherein all of the at least two neutralization regions have different electric potentials, and an electric potential increasing along an exhaust gas flow direction is present in the at least one surface separator.

11. A motor vehicle, comprising:
    an internal combustion engine; and
    an exhaust gas system connected to said internal combustion engine and including a device according to claim 1.

12. A motor vehicle, comprising:
    an internal combustion engine; and
    an exhaust gas system connected to said internal combustion engine and configured to carry out the method according to claim 6.

* * * * *